April 7, 1931.  E. G. McCAULEY  1,799,828
PROPELLER CONTROL MECHANISM
Filed April 30, 1923  2 Sheets-Sheet 1
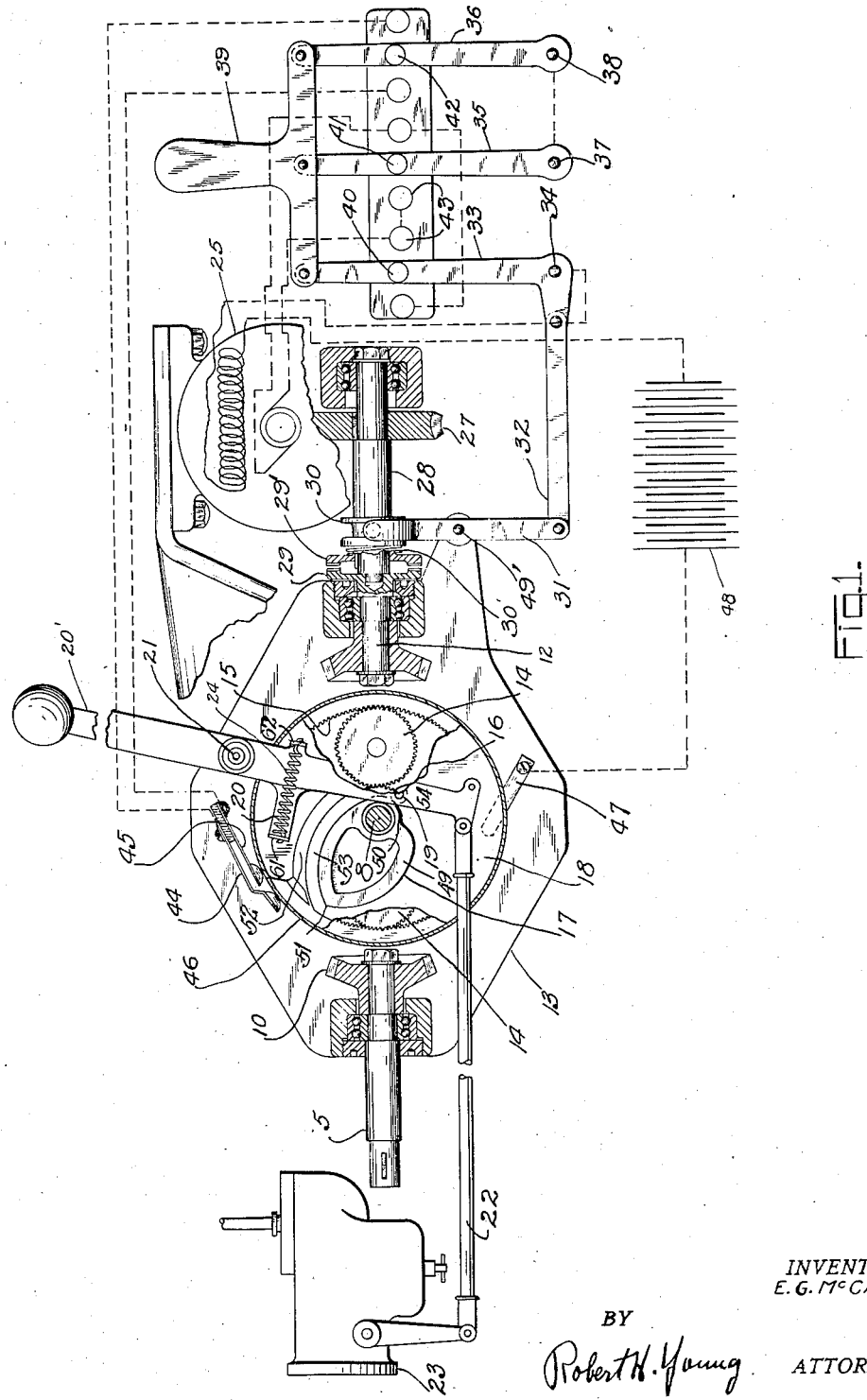
INVENTOR
E. G. McCAULEY
BY
Robert H. Young, ATTORNEY

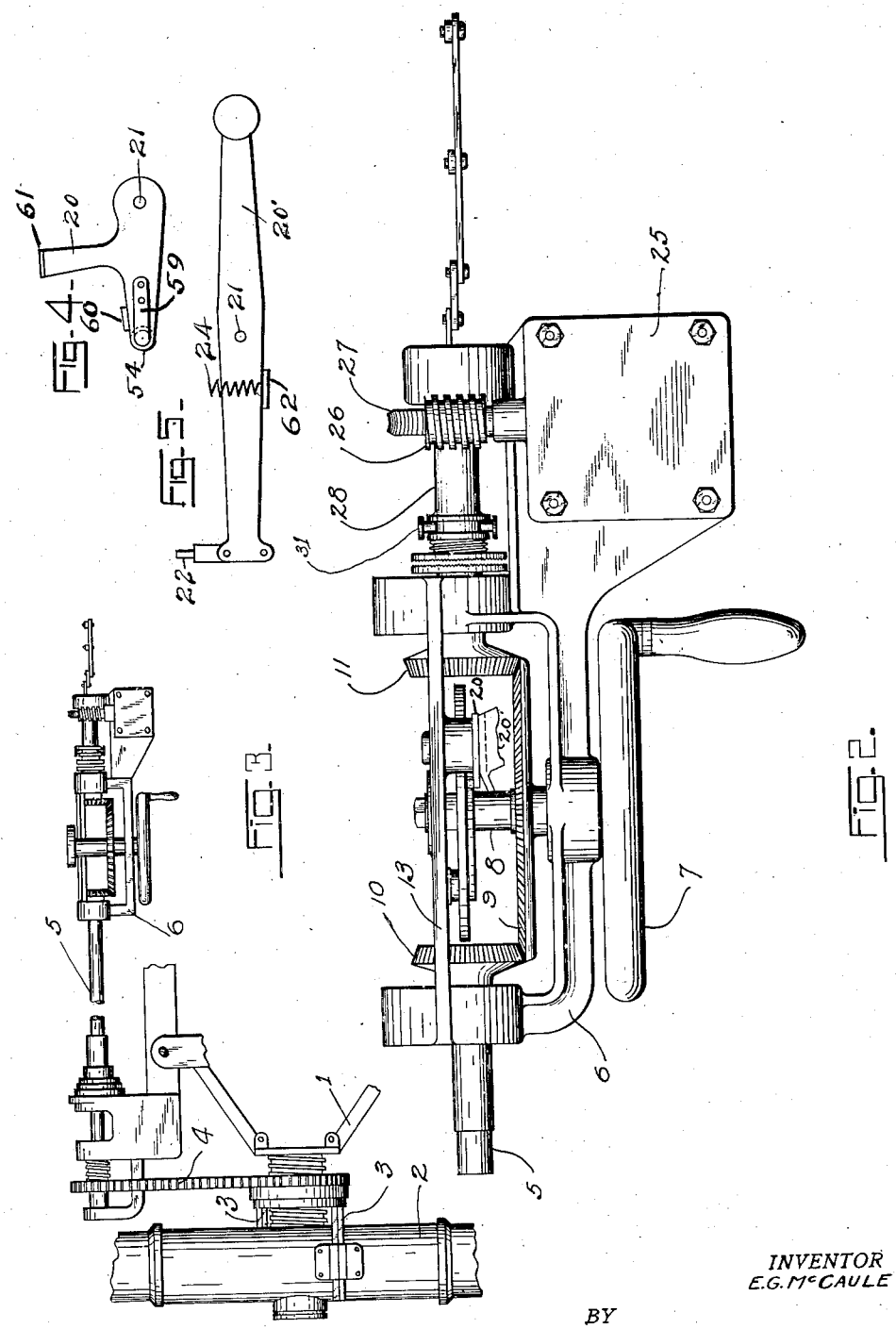

Patented Apr. 7, 1931

1,799,828

UNITED STATES PATENT OFFICE

ERNEST G. McCAULEY, OF DAYTON, OHIO, ASSIGNOR TO STANDARD STEEL PROPELLER CORPORATION, A CORPORATION OF PENNSYLVANIA

PROPELLER-CONTROL MECHANISM

Application filed April 30, 1923. Serial No. 635,817.

This invention relates to propeller control mechanism of the type used in controlling or reversing the pitch of the propeller in an airplane.

The main object of this invention is to provide a propeller control device which may be operated manually or which may be operated through a power force in order to relieve the physical strain of the operator.

Further objects will be more fully set forth in the accompanying description and claims.

In the drawings Figure 1 is a sectional elevation through a propeller control bracket showing the electric connections between the motor and the propeller control mechanism.

Figure 2 is a plan view of the propeller control mechanism and Figure 3 is a general plan view of the propeller control mechanism connected to a propeller or an airplane.

Fig. 4 is a detail of the throttle compensating lever, and Fig. 5 is a detail of the throttle control lever.

The airplane structure is designated by the numeral 1 and supported at the forward part of the airplane in the customary manner is a propeller 2 of the reversible pitch type. The pitch of the propeller blades may be adjusted by means of bars 3 which are operated by means of suitable screw mechanism driven by a chain 4 which is operated by means of a shaft 5. Mounted near the pilot is a control bracket 6 which carries a hand wheel 7 connected to a shaft 8 and a bevel gear 9. A bevel gear 10 which meshes with the gear 9 is provided on the end of the shaft 5 within the control bracket and a second bevel gear 11 opposite to the gear 10 and meshing with gear 9 is provided on the end of a stub shaft 12, mounted in a suitable bearing in the bracket 6. A plate 13 is integral with the bracket 6 opposite to the hand wheel 7 and a plurality of spur gears 14 are rotatably supported by this plate 13. These gears 14 mesh with a large gear 15 and a small central spur gear 16. This gear 16 is suitably splined or keyed to the shaft 8 so as to rotate therewith and serve to drive the gears 14 to rotate the large gear 15 at a reduced speed. Rotating with the large gear 15 is a cam 17 which is fastened to the plate 18 made integral with the side of the gear 15, and revolubly mounted on shaft 8.

The hand wheel 7 may be rotated to drive the bevel gear 10 through bevel gear 9 in order to manually change or reverse the pitch of the propeller blades. The motion of the hand wheel 7 also drives the plate 18 and cam 17 around the axis of the shaft 8 and this cam operates a pin 19 on a throttle compensating lever 20 and throttle control lever 20' mounted upon a stud 21 on the rear plate 13 of the control bracket. This throttle lever will be operated by the cam as the latter rotates to operate the rod 22 which is connected to the throttle of the carburetor 23 so as to cut down the speed of the motor when the pitch of the propeller is at or near a zero angle so as to prevent the motor from speeding up and racing excessively when the propeller pitch is being reversed. A spring 24 connected to the throttle lever 20' and compensating lever 20 provides for movements of throttle lever 20' to the off position at all times. The cam disc has secured thereto a suitable cam 49. This cam having the "on" and "off" positions indicated at 50 and 51, and cam surfaces connecting these extreme positions. A cam guide 52 is also riveted to the cam disc and is arranged in spaced relation to the cam to provide a cam groove 53 adapted to act as a track for a roller 54 carried by the compensating lever 20 which is rotatably supported upon a pivot pin 19. The throttle lever 20' is also rotatably mounted upon this pivot pin. The compensating lever 20 carries the cam roller 54 which is spring pressed by means of a leaf spring 59 secured at one end to the compensating lever and bearing at the other end against the roller. This spring tends to urge the roller into contact with the cam disc. The compensating lever is provided with a lug 60 which is adapted to engage the throttle lever and move the same with the compensating lever for the purpose of moving the throttle valve toward closed position. The compensating lever is also provided with upstanding lug 61 and the throttle lever is provided with the lug 62, which lugs are connected by means of a coil spring 24. This coil spring allows the throttle valve to be manually moved to "off" position irrespective of the position of the cam roller and also acts to move the throttle valve toward open position in accordance with the position of the cam roller on the cam. When the throttle lever is in the "on" position it is superimposed on top of the compensating lever and held thereon by means of the spring 24 drawing it against the lug 60 on the compensating lever. In this position when the throttle is moved to the "off" position, the compensating lever is also moved by reason of the connecting spring. But it may so happen that the position of the cam 49 is such that the roller 54 is in the guideway 53 in such a position that the compensating lever is held against movement. In such case, the throttle may be moved to the "off" position irrespective of the compensating lever.

In order to control the pitch adjusting mechanism through a source of power, I provide an electric motor 25 driving a worm 26 engaging a worm gear 27 on a shaft 28. This shaft is mounted in suitable bearings in alignment with the stub shaft 12, and clutch faces 29 and 29' are provided on the adjacent ends of shafts 12 and 28. A collar 30 integral with clutch face 29' is slidably mounted and keyed on shaft 28 and is adapted to bring the clutch face 29' into engagement with opposite clutch face 29. Collar 30 is operated by fork lever 31 pivoted at 49 connected by link 32 to a bell crank lever 33 pivoted at 34. A spring 30' is placed between clutch face 29' and fork lever 31 to cause an easy engagement between the clutch faces and to take up lost motion.

Link 33 and rods 35 and 36 pivoted at 38 and 37 respectively are connected by a hand operating member 39 and form a two-way multiple pole switch. Contact points 40, 41 and 42 on the respective members 33, 35 and 36, which are electric conductors, are adapted to contact with three of the six contact points 43 with the handle 39 in one position and adapted to contact with the other three when the handle is operated in the opposite direction. These contact points 43 are connected to the armature and field of the electric motor 25 and are connected to two brushes 44 and 45 as shown in Figure 1. These brushes contact with a brush band formed on the outer annular surface of the large gear 15, a strip of insulating material being provided in this brush band so as to break the circuit of one of the brushes when the brush is on this insulating strip. A third brush 47 contacts with the side of the gear 15 and is connected to a suitable source of power such as the battery 48 which is connected as shown to the field of the motor.

The electric connections are such that when the reversing switch 39 is removed in one direction as to the left in Figure 1, the electric circuit will be completed through the battery, motor, and contact brush 45 and at the same time the bell crank lever 33 operates to engage the motor with the bevel gear 11 so as to drive the propeller reversing mechanism in the same manner as it is driven by the hand wheel 7. The gear 15 will rotate until it has completed almost one revolution at which time the contact brush 45 engages the insulation strip 46 and the motor stops running. This point corresponds to the full reverse or full ahead position of the propeller blades and the insulation serves as a means of preventing the motor drive from damaging the control mechanism after the propeller blades have reached their extreme travel in either direction.

When the handle on the switch is operated to the right as shown in Figure 1 the circuit will be completed through contact 44 which will be contacting with a point on the brush band to the left of the insulating strip and the wheel 15 and cam 17 will rotate clockwise to change the pitch of the propeller blades, from a reverse pitch to a normal flying or ahead pitch position.

As the pitch is changed the throttle control lever is also operated in synchronism by the cam 17 causing the throttle valve at the carburetor to close and open automatically in relation to the angular position of the propeller blades. The compensating device allows the throttle lever to be moved to the "off" or closed position at any time, irrespective of the position of the propeller blades. A dual synchronized control mechanism is thus provided which may be operated manually or through a power means.

I claim:
1. In a propeller control mechanism, for aircraft, manually operated mechanism for manually changing the pitch of the blades of the propeller, a motor, means for connecting said motor to said manually operated mechanism and a manually operated device for controlling said motor and said means.

2. In a propeller control mechanism for aircraft, manually operated mechanism for manually changing the pitch of the blade of the propeller, a reversible motor, and means for controlling the direction of rotation of said motor and for connecting said motor to said mechanism.

3. In a propeller control mechanism for aircraft, manually operated mechanism for changing the pitch of the blades of the propeller, a throttle lever adapted to be moved in synchronism with said manually operated mechanism, a reversible electric motor for operating said manually operated mechanism, and a hand operated member for controlling the direction of rotation of said electric motor and for connecting said motor to said mechanism.

4. In a propeller control mechanism for aircraft, a rotatable device for adjusting the angularity of the blades, a rotatable member connected with said device, provided with an electrical conducting part and an insulating part, an electric motor adapted to operate said device, a reversing switch for controlling said motor, and electrical connections between said switch, motor and rotatable member whereby the electric circuit will be broken by the insulating part of said rotatable member at a predetermined position of the blades.

5. In a propeller control mechanism for aircraft, manually operated mechanism for manually changing the pitch of the blades, a throttle control adapted to be moved in synchronism with said manually operated mechanism, an electric motor for operating said manually operated mechanism, a hand operated member for controlling the rotation of the electric motor and means for breaking the circuit through the motor when the blades have been adjusted to a predetermined position.

6. In a propeller control mechanism, a main control bracket, a central shaft rotatably mounted in said bracket and connected to a blade adjusting device, a control shaft rotatably mounted in said bracket, a cam mounted on one of said shafts, a throttle lever adapted to be operated by said cam as the latter is rotated, a circular brush band provided with an insulating portion on one of said shafts, a plurality of brushes adapted to engage said brush band, an electric motor, transmission mechanism for connecting said motor to said control shaft, means for controlling said electric motor, electrical connections between said means, motor and brushes, said insulation portion of the brush band being adapted to break the circuit and stop the motor at a predetermined position of the blades.

7. In combination with the throttle valve of an engine, a propeller with a plurality of adjustable blades, mechanism for changing the angularity of said adjustable blades, multiple control means for simultaneously actuating said mechanism and said throttle valve in predetermined relation with each other, said multiple control means including a manually operable handle and a power means, and compensating devices to allow the actuation of said throttle valve to a closed position, irrespective of the position of said blades and said multiple control means, substantially as set forth.

8. In combination with the throttle valve of an engine, a propeller with a plurality of blades, mechanism for changing the angularity of said blades, synchronized devices for actuating said throttle valve and said mechanism, multiple control means for actuating said synchronized devices, said multiple control means including a manually operable handle, and a power means, and compensating devices for operating said throttle valve independent of said synchronized devices, substantially as set forth.

9. In a propeller control mechanism, for aircraft, manually operated mechanism for manually changing the pitch of the blades of the propeller, power means, a switch lever for automatically connecting said power means to said manual means, simultaneously with the application of power to the power means.

10. In a propeller control mechanism, for aircraft, manually operated mechanism for manually changing the pitch of the blades of the propeller, power means, a two-way switch lever for automatically connecting said power means to said manual means, simultaneously with the application of power to the power means.

In testimony whereof I affix my signature.

ERNEST G. McCAULEY.

CERTIFICATE OF CORRECTION.

Patent No. 1,799,828.  Granted April 7, 1931, to

ERNEST G. McCAULEY.

It is hereby certified that the name of the assignee in the above numbered patent was erroneously described and specified as "Standard Steel Propeller Corporation", whereas said name should have been described and specified as The Hamilton Standard Propeller Corporation, as shown by the records of assignments in this office; and that the said Letters Patent should be read with this correction therein that the same may conform to the record of the case in the Patent Office.

Signed and sealed this 5th day of May, A. D. 1931.

(Seal)

M. J. Moore,
Acting Commissioner of Patents.